United States Patent
Gillund et al.

[11] 3,732,538
[45] May 8, 1973

[54] ELECTRONIC VEHICLE SEAT OCCUPANT SENSOR

[75] Inventors: Arden G. Gillund, Oak Creek; John A. Moretti, Greendale, both of Wis.

[73] Assignee: General Motors Corporation, Detroit, Mich.

[22] Filed: Feb. 23, 1972

[21] Appl. No.: 228,544

[52] U.S. Cl............340/52 E, 340/278, 307/10 SB
[51] Int. Cl...........................................G08b 21/00
[58] Field of Search..........340/52 R, 52 E, 258, 340/278; 307/10 SB

[56] References Cited

UNITED STATES PATENTS 3,439,358   4/1969   Salmons................340/258

*Primary Examiner*—Alvin H. Waring
*Attorney*—C. R. Meland et al.

[57] ABSTRACT

An electrical antenna system including first and second elements is embedded in the seat of a vehicle with the first element being coupled to the output of a controlled AC source which supplies thereto a controlled alternating signal. The second element of the antenna system is connected to the input of a high impedance dectector. A wire mesh capacitively coupled the two elements and the signal coupled from the first element to the second element is detected by the detector. When a human is in proximity to the wire mesh, the capacitance characteristic of the human capacitively loads the antenna to the vehicle chassis which decreases the signal input to the detector. An indicator is responsive to the output of the detector to provide an indication when the signal input to the detector decreases due to the presence of the human in the proximity of the wire mesh to indicate the presence thereof. Distributed multiple wire antennas with and without conductive wire mesh and single wire antenna systems are described.

3 Claims, 5 Drawing Figures

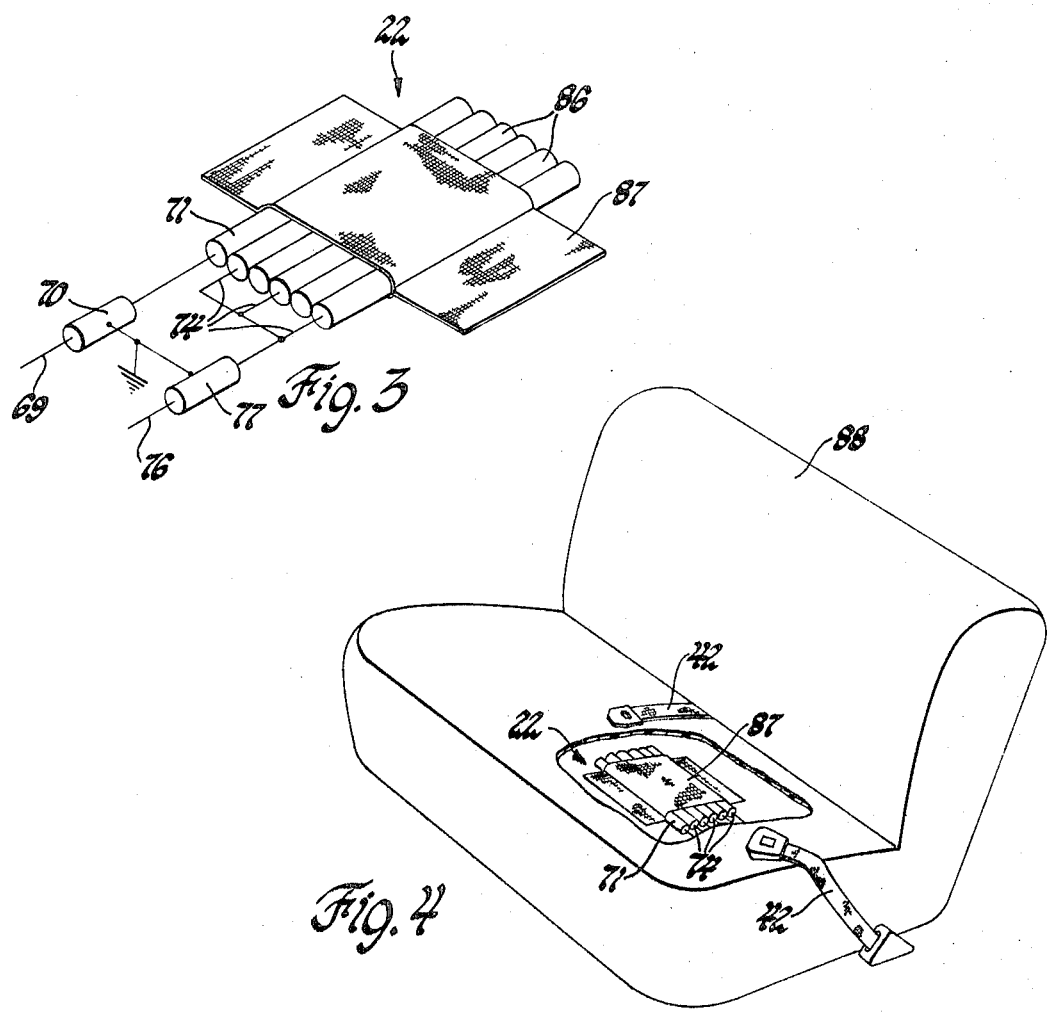
Fig. 3
Fig. 4
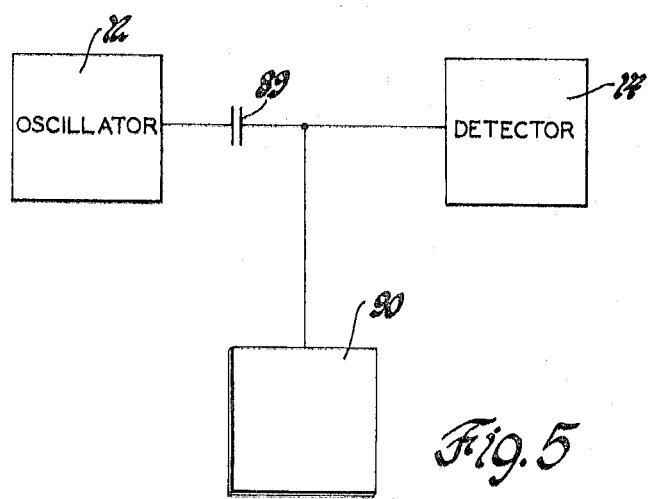
Fig. 5

ELECTRONIC VEHICLE SEAT OCCUPANT SENSOR

This invention relates to an apparatus for providing an indication of the presence of an occupant of a vehicle seat. More specifically, this invention relates to such an apparatus using the capacitance characteristics of the human body to capacitively load an electrical antenna carried by the vehicle seat in the area normally occupied by an occupant.

Apparatus for sensing the presence of a vehicle seat occupant has usually taken the form of a mechanical switch which is actuated by the weight of the occupant in the seat. In contrast, it is the general object of this invention to provide an apparatus for electronically sensing the presence of an occupant in a vehicle seat.

Another object of this invention is to provide an apparatus for sensing the presence of a vehicle seat occupant, which apparatus does not have moving parts and which discriminates between conductive and nonconductive objects in proximity with the antenna.

It is another object of this invention to provide an apparatus for sensing the presence of a vehicle seat occupant by the use of the capacitance characteristics of the human body to load an antenna system embedded in the vehicle seat, the magnitude of the loading being sensed to provide an indication of the presence of the occupant.

These objects are accomplished by supplying the output of a controlled AC source to an electrical conductor carried by the seat, capacitively coupling this electrical conductor to a second electrical conductor whose output is connected to a detector which detects the signal coupled thereto. The means used for coupling the two electrical conductors is also carried by the seat in the area normally occupied by an occupant and is itself capacitively coupled to the vehicle chassis by the occupant when on the seat. This coupling decreases the input to the detector whose output is supplied to an indicator to provide an indication of the presence of the vehicle seat occupant. Another antenna configuration uses a discrete coupling capacitor to simulate source and sink conductor coupling capacitance and a separate antenna of adjustable size energized by a single feed wire.

The invention may be best understood by reference to the following description of a preferred embodiment and the drawings, in which:

FIG. 3 is a schematic drawing of the antenna and pickup assembly of FIGS. 1 and 2;

FIG. 4 is a schematic of a vehicle seat showing the location of the apparatus of FIG. 3; and FIG. 5 is a schematic diagram of another embodiment of the antenna and pickup assembly of FIGS. 1 and 2.

Figure 1:
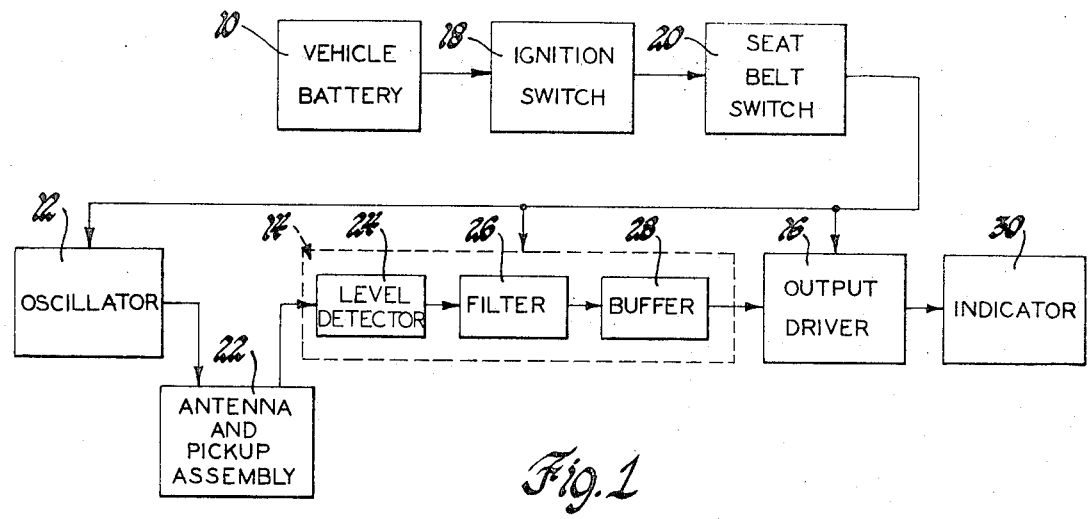
FIG. 1 is a block diagram of the preferred embodiment of this invention.

Referring to the block diagram of FIG. 1, a vehicle battery 10 supplies power to an oscillator 12, a detector 14, and an output driver 16 through an ignition switch 18 and a normally closed seat belt switch 20 which is open only when the vehicle seat belt members are coupled. The output of the oscillator 12 is supplied to an antenna and pickup assembly 22 which is embedded under the surface of a vehicle seat in an area normally occupied by an occupant. In the absence of a vehicle seat occupant, the antenna and pickup assembly 22 supplies an alternating signal having a magnitude above a predetermined threshold to the detector 14 and in the presence of a vehicle seat occupant, the antenna and pickup assembly 22 supplies a signal having a magnitude less than the predetermined threshold to the detector 14. The detector 14 is comprised of a high input impedance level detector 24 whose output is supplied to a filter 26. The output of the filter 26 is supplied to a buffer 28 whose output in turn is supplied to the output driver 16 which drives an indicator 30. The detector 14 is responsive to the output of the antenna and pickup assembly 22 for energizing the output driver 16 when the signal supplied to the detector 14 is below the predetermined threshold to energize the indicator 30 to thereby provide an indication of a vehicle seat occupant and his failure to buckle the seat belt members.

Figure 2:
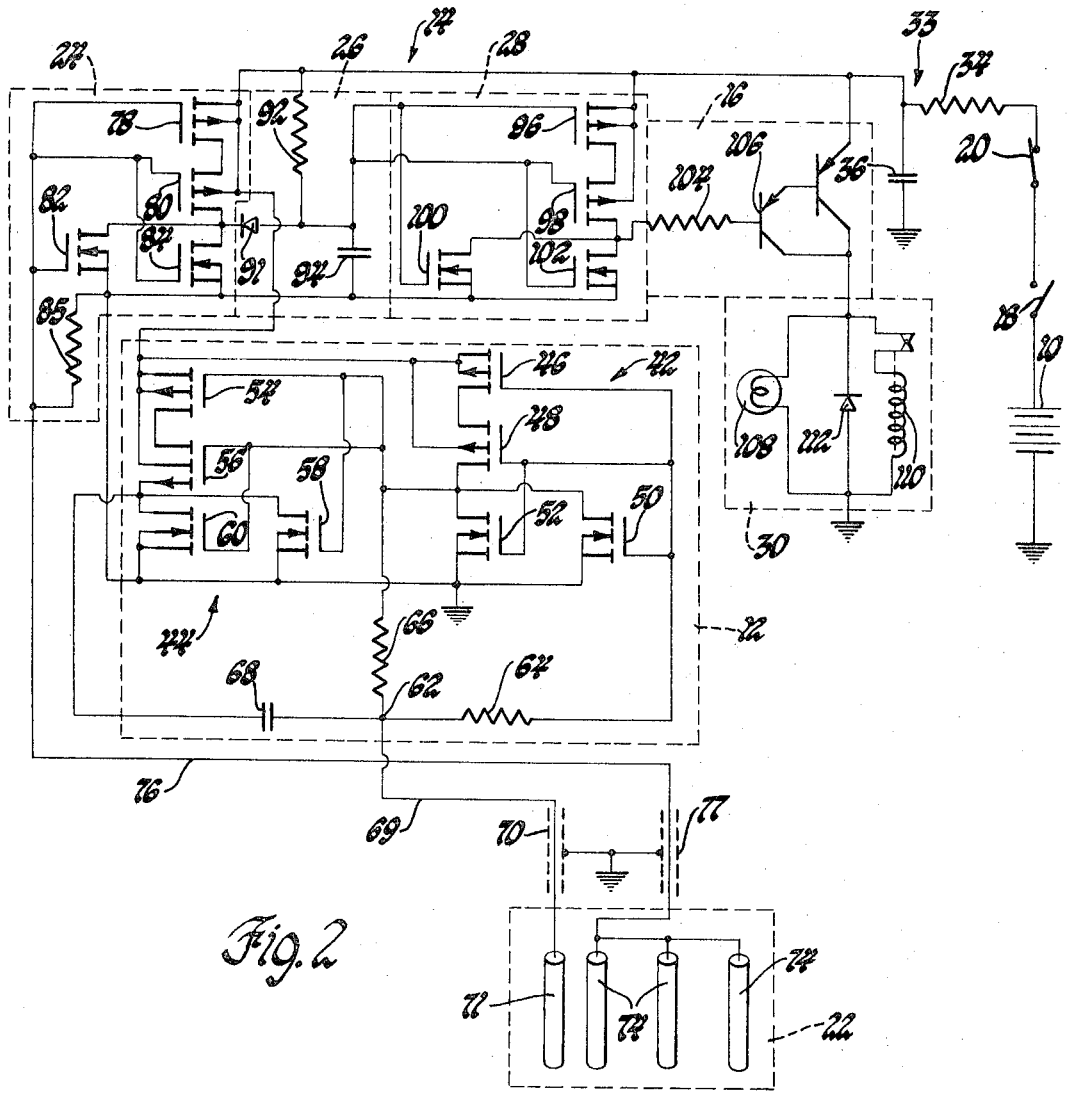
FIG. 2 is an electrical schematic of the preferred embodiment of this invention.

Referring to FIG. 2, the vehicle battery 10 supplies power to the oscillator 12, the detector 14 and the output driver 16 through the ignition switch 18, a normally closed seat belt switch 20 and a noise filter 33 comprised of a resistor 34 and a capacitor 36. The normally closed seat belt switch 20 is operatively associated with a set of seat belt members 42 (FIG. 4) so as to be opened whenever the members 42 are buckled. This form of switch is well known and will not be described in greater detail.

The power supplied to the oscillator 12, the detector 14 and the output driver 16 from the filter 33 is taken across the capacitor 36 and will hereinafter be referred to as B+.

Unless the contrary is indicated, the following description will assume the normally closed seat belt switch 20 is closed. The oscillator 12, the level detector 24, and the buffer 28 are shown mechanized principally from four NOR gates of the C-MOS QUAD 2 INPUT NOR gate chip CD4001E manufactured by Radio Corporation of America, Princeton, New Jersey. The system is shown as mechanized with this device for illustration purposes only and is not limited thereto. Any circuits performing the functions and having the necessary characteristics as hereinafter set forth can be used in the mechanization of this system. For example, operation of the system using bipolar technology has been successfully demonstrated.

The oscillator 12 is mechanized with a NOR gate 42 and a NOR gate 44. The NOR gate 42 is comprised of P channel enhancement MOSFET's 46 and 48, the source and substrate electrodes of the MOSFET 46 and the substrate electrode of the MOSFET 48 being connected to B+. The source electrode of the MOSFET 48 is connected to the drain electrode of the MOSFET 46. The NOR gate 42 is also comprised of N channel enhancement MOSFET's 50 and 52, the source and substrate electrodes thereof being connected to ground and the drain electrodes thereof being connected to the drain electrode of the MOSFET 48. The gate electrodes of the MOSFET's 46 and 50 are connected together to serve as one input of the NOR gate 42 and the gate electrodes of the MOSFET's 48 and 52 are connected together to serve as a second input.

The NOR gate 44 is comprised of P channel enhancement MOSFET's 54 and 56 and N channel enhancement MOSFET's 58 and 60 connected in identical fashion as the respective MOSFET's 46, 48, 50 and 52 in the NOR gate 42. The inputs of the NOR gate 42 are connected to one another and to a junction point 62 through a resistor 64. Connected in this fashion, the NOR gate 42 functions as an inverter whose output is taken at the drain electrodes of the MOSFET's 50 and 52 which are connected directly to the inputs of the NOR gate 44, which also functions as an inverter, and connected to the junction 62 through a resistor 66. The output of the NOR gate 44 is taken at the drain electrodes of the MOSFET's 58 and 60 which are connected to the junction 62 through a capacitor 68.

The NOR gates 42 and 44 in conjunction with the RC network comprised of the resistors 64 and 66 and the capacitor 68 supply at the junction 62 a signal having a frequency determined by the RC networks previously described. This frequency, for illustration purposes only, may be 16.6 khz.

The output of the oscillator 12 is supplied from the junction 62 through a cable 69 having a grounded shield 70 to an insulated electrical conductor 71 serving as an antenna in the antenna and pickup assembly 22. The antenna and pickup assembly 22 is also comprised of insulated electrical conductors 74 whose outputs are supplied to the high impedance level detector 24 through a cable 76 having a grounded shield 77.

The high impedance level detector 24 is comprised of P channel enhancement MOSFET's 78 and 80 and N channel enhancement MOSFET's 82 and 84 connected as a NOR gate in identical fashion as the respective MOSFET's 46 through 52 in the NOR gate 42. The input to the level detector 24 through the cable 76 is supplied to the gate electrodes of the MOSFET's 78, 80, 82 and 84 which are connected to ground through a large resistor 85. Consequently, the output of the buffer taken at the drain electrodes of the MOSFET's 82 and 84 is an inverse function of the input.

Referring now to FIG. 3, the antenna and pickup assembly 22 previously described is shown in greater detail. As shown therein, the insulated electrical conductor 71 is positioned adjacent one of the insulated electrical conductors 74 which are spaced apart by like open-ended conductors 86 as shown. The insulated electrical conductor 71 receives an input through the cable 69 and the insulated electrical conductors 74 supply a signal through the cable 76.

The alternating signal input to the insulated electrical conductor 71 from the oscillator 12 is capacitively coupled to the insulated electrical conductors 74 by means of a wire mesh 87 which is tightly wrapped around the insulated electrical conductors 71 and 74 and then flared out to provide a large surface area as shown. This coupling could also be accomplished by an insulation dielectric. The antenna and pickup assembly 22 is embedded under the surface of a seat 88 as shown in FIG. 4 in the area normally occupied by an occupant. Although shown embedded, the antenna and pickup assembly 22 could otherwise be carried by the seat 88. Due to the capacitive coupling provided by the wire mesh 87, the alternating signal input to the insulated electrical conductor 71 is coupled to the insulated electrical conductors 74 which supply an alternating signal input to the high input impedance level detector 24 in the detector 14 of FIG. 2 through the cable 76.

The magnitude of this signal is above a threshold level which is sufficient to cause the level detector 24 to switch at a frequency equal to the frequency of the output of the oscillator 12. The resulting alternating signal from the output of the level detector 24 is supplied to the filter 26. If an occupant is positioned on the seat 88 of FIG. 4 in close proximity to the conductors 71 and 74 and the wire mesh 87, he provides an increased capacitance from the antenna and pickup assembly 22 to the chassis of the vehicle (not shown). As a result, the coupling between the insulated electrical conductor 71 and the insulated electrical conductors 74 is considerably reduced with a resulting reduction in the magnitude of the signal supplied to the high input impedance level detector 24 to a level below the threshold level. At magnitudes below the threshold level, the MOSFET's 78 and 80 are biased into conduction and the MOSFET's 82 and 84 are biased into nonconduction. Consequently, a signal having a magnitude of B+ is supplied at the output of the high input impedance level detector 24 at the drain electrodes of the MOSFET's 82 and 84. By adjusting the number of electrical conductors 71 and 74 and/or by the inclusion of a conductive sheet area (not shown) coupled to those conductors, the sensitivity of the system can be adjusted.

Referring to FIG. 5, there is shown a second embodiment of the antenna and pickup assembly 22. In this embodiment, the output of the oscillator 12 is coupled to the input of the detector 14 through a capacitor 89 and coupled to an electrically conductive plate 90 through the capacitor 89. The electrically conductive plate 90 is embedded in or otherwise carried by the vehicle seat 88 in the area normally occupied by an occupant so as to provide a large surface area to the occupant when in the seat 88. Although shown as a plate, the electrically conductive plate 90 could take the form of the wire mesh 86 in FIG. 3 or a conductive foam cushion in the seat. In the absence of an occupant, the signal supplied to the detector 14 has a magnitude greater than the threshold level previously described to cause the level detector 24 to switch. If an occupant is positioned on the seat 88 of FIG. 4 in close proximity to the electrically conductive plate 90, he and the electrically conductive plate 90 combine to provide an increased capacitance from the capacitor 89 to the chassis of the vehicle. Consequently, the magnitude of the signal supplied to the high input impedance level detector 24 is reduced to a level below the threshold level resulting in the signal having the magnitude of B+ being supplied at the output of the level detector 24 as previously described. By varying the size of the capacitor 89 and the area of the conductive plate 90, the sensitivity of the system can be adjusted.

The filter 26 is comprised of a diode 91 having its cathode connected to the output of the level detector 24 and its anode connected to B+ through a resistor 92 and connected to ground through a capacitor 94. While the level detector 24 is switching in response to a signal input having a magnitude greater than the threshold level from the antenna and pickup assembly 22, the capacitor 94 cyclically charges through the resistor 92 and discharges through the MOSFET's 82 and 84. The output of the filter 26 taken from between the resistor 92 and the capacitor 94 is a signal having a magnitude near ground potential. When the output of the level detector 24 is at B+, as occurs when there is a vehicle seat occupant as previously described, the diode 91 is reverse biased and the capacitor consequently is charged through the resistor 92 to B+.

The output of the filter 26 is supplied to a buffer 28 comprised of P channel enhancement MOSFET's 96 and 98 and N channel enhancement MOSFET's 100 and 102 connected as a NOR gate in identical manner as the NOR gate 42 in the oscillator 12 with the gate electrodes of the MOSFET's 96 and 100 connected together to serve as one input and the gate electrodes of the MOSFET's 98 and 102 connected together to serve as a second input. The output of the filter 26 is supplied to both inputs of the buffer 28 which, as a result, functions as an inverter, the inverted output being supplied at the drain electrodes of the MOSFET's 100 and 102. In the absence of a vehicle seat occupant, the output of the filter 26 across the capacitor 94 is near ground, as previously described. Consequently, the buffer 28 supplies a potential at near B+ to the output driver 16 from the drain electrodes of the MOSFET's 100 and 102. In the presence of a vehicle seat occupant, the input to the buffer 28 from the filter 26 is at B+ as previously described. Consequently, the buffer 28 supplies a ground signal to the output driver 16.

The output driver 16 includes an input resistor 104 connected between the output of the buffer 28 and the base electrode of a PNP Darlington amplifier 106 having its emitter electrode connected to B+ and its collector electrodes connected to the indicator 30. The indicator 30 is comprised of an indicator lamp 108 and buzzer 110 connected in parallel between the collector electrodes of the Darlington amplifier 106 in the output driver 16 and ground. A diode 112 is connected in parallel with the buzzer 110, the anode thereof being connected to ground. The diode 112 eliminates inductive spikes generated by the buzzer 110. In the absence of a vehicle seat occupant, the output of the buffer 28 is B+, as previously indicated, which biases the Darlington amplifier 106 into nonconduction to maintain the indicator lamp 108 and a buzzer 110 deenergized. In the presence of a vehicle seat occupant, the output of the buffer 28 is ground which biases the Darlington amplifier 106 into conduction to energize the indicator 108 and the buzzer 110 to provide an indication of the presence of the vehicle seat occupant.

The foregoing discussion has assumed that the seat belt members 42 remain uncoupled so that the seat belt switch 20 is closed. If the vehicle seat occupant opens the seat belt switch 20 by coupling the seat belt members 42, power to the circuits previously described is interrupted and the indicator lamp 108 and the buzzer 110 will remain deenergized. As can be seen, the seat belt switch 20 operates in conjunction with the remaining circuits to provide an indication of the failure of a vehicle seat occupant to couple the seat belt members.

The seat occupant sensor described could be used with other systems such as an air cushion restraint system, seat belt ignition interlock system or other systems where knowledge of a seat occupant is required.

The detailed description of the preferred embodiment of the invention for the purpose of explaining the principles thereof is not to be considered as limiting or restricting the invention, since many modifications may be made by the exercise of skill in the art without departing from the scope of the invention.

We claim:

1. A seat occupant sensor for a vehicle having a chassis serving as an electrical ground comprising, in combination, a first electrical conductor carried by the seat in an area normally occupied by the occupant; a controlled AC source coupled to the first electrical conductor for supplying thereto an alternating signal; a detector responsive to a signal applied to an input thereof for generating an output having a first state when the signal applied to the input has a magnitude greater than a predetermined threshold and having a second state when the magnitude is below the predetermined threshold; a second electrical conductor carried by the seat in the area normally occupied by the occupant; means connecting the second electrical conductor to the input of the detector; and means for capacitively coupling the first and second electrical conductors to supply the alternating signal with a magnitude greater than the predetermined threshold to the input of the detector in the absence of an occupant, said means including a surface area carried by the seat in the area normally occupied by the occupant which is capacitively coupled to chassis ground by the occupant when near the surface area to decrease the magnitude of the alternating signal supplied to the input of the detector below the predetermined threshold, whereby the output of the detector is in the second state while the vehicle seat is occupied.

2. A seat occupant indicator for a vehicle having a chassis serving as an electrical ground comprising, in combination, a first electrical conductor embedded under the surface of the seat normally occupied by the occupant; a controlled AC source coupled to the first electrical conductor for supplying thereto an alternating signal; a detector responsive to a signal applied to an input thereof for generating an output having a first state when the signal applied to the input has a magnitude greater than a predetermined threshold and having a second state when the magnitude is below the predetermined threshold; a second electrical conductor embedded under the surface of the seat normally occupied by the occupant; means connecting the second electrical conductor to the input of the detector; means for capacitively coupling the first and second electrical conductors to supply the alternating signal with a magnitude greater than the predetermined threshold to the input of the detector in the absence of an occupant, said means including a surface area embedded under the surface of the seat normally occupied by the occupant which is capacitively coupled to chassis ground by the occupant when near the surface area to decrease the magnitude of the alternating signal supplied to the input of the detector below the predetermined threshold; and indicator means coupled to the high input impedance detector for providing an indication when the output thereof is in a second state so as to thereby indicate the presence of the vehicle seat occupant.

3. A seat occupant indicator for a vehicle having a chassis serving as an electrical ground reference comprising, in combination, a power source; a first electrical conductor embedded under the surface of the seat normally occupied by the occupant; a controlled AC source coupled to the first electrical conductor for supplying thereto an alternating signal when said AC source is connected to the power source; a detector responsive to a signal applied to an input terminal thereof for generating an output when said detector is coupled to the power source, said output having a first state when the signal applied to the input terminal has a magnitude greater than a predetermined threshold and having a second state when the magnitude is below the predetermined threshold, the detector including at least one MOSFET having a gate electrode connected to the input terminal; a second electrical conductor embedded under the surface of the seat normally occupied by the occupant; means for connecting the second electrical conductor to the input terminal of the detector; a wire mesh capacitively coupling the first and second electrical conductors to supply the alternating signal with a magnitude greater than the predetermined threshold to the input of the high input impedance detector in the absence of an occupant, the wire mesh including a surface area embedded under the surface of the seat normally occupied by the occupant which is capacitively coupled to the chassis ground by the occupant when near the surface area to decrease the magnitude of the alternating signal supplied to the input terminal of the detector below the predetermined threshold; indicator means coupled to the detector for providing an indication when the output thereof is in the second state and said indicator means is coupled to the power source; a pair of selectively coupled or decoupled seat belt members; and seat belt member responsive switch means for coupling the AC source, the detector and the indicator means to the power source when the seat belt members are decoupled, whereby the indicator means provides an indication of the presence of the vehicle seat occupant upon his failure to couple the seat belt members.

* * * * *